United States Patent [19]
Yoshida

[11] Patent Number: 5,395,005
[45] Date of Patent: * Mar. 7, 1995

[54] LID DEVICE FOR WIDE-MOUTHED CONTAINER AND METHOD FOR MAKING THE SAME

[75] Inventor: Yoshiaki Yoshida, Nara, Japan

[73] Assignee: Tenryu Chemical Industry Co., Ltd., Nara, Japan

[ * ] Notice: The portion of the term of this patent subsequent to Jul. 12, 2011 has been disclaimed.

[21] Appl. No.: 167,098

[22] Filed: Dec. 15, 1993

Related U.S. Application Data

[63] Continuation of Ser. No. 870,868, Apr. 20, 1992.

[30] Foreign Application Priority Data

| Apr. 22, 1991 | [JP] | Japan | 3-27573 U |
| Jun. 28, 1991 | [JP] | Japan | 3-158615 |
| Jun. 28, 1991 | [JP] | Japan | 3-158952 |
| Aug. 2, 1991 | [JP] | Japan | 3-194538 |

[51] Int. Cl.⁶ .......................................... B65D 41/00
[52] U.S. Cl. ............................... 220/359; 220/270; 220/276
[58] Field of Search ................ 220/269, 270, 276, 359

[56] References Cited

U.S. PATENT DOCUMENTS

| 3,184,096 | 5/1965 | Cheeley . |
| 4,253,584 | 3/1981 | Bloeck et al. . |
| 5,038,468 | 8/1991 | Wanatowicz . |
| 5,054,642 | 10/1991 | Yoshida . |

FOREIGN PATENT DOCUMENTS

| 0059635 | 9/1982 | European Pat. Off. . |
| 0336438 | 10/1989 | European Pat. Off. . |
| 0392078 | 10/1990 | European Pat. Off. . |
| 62-108229 | 7/1987 | Japan . |

*Primary Examiner*—Allan N. Shoap
*Assistant Examiner*—Nova Stucker
*Attorney, Agent, or Firm*—William H. Eilberg

[57] ABSTRACT

A lid device for a wide-mouthed container comprises a metallic lid body having an inner margin defining an opening of a predetermined shape, a resinous rim member extending along and anchored to the inner margin of the lid body, and a closure film attached to the rim member to close the opening of the lid body. The lid body is fittable to an open mouth of the container. For opening, the closure film may be peeled off the rim member or torn along the rim member.

6 Claims, 10 Drawing Sheets

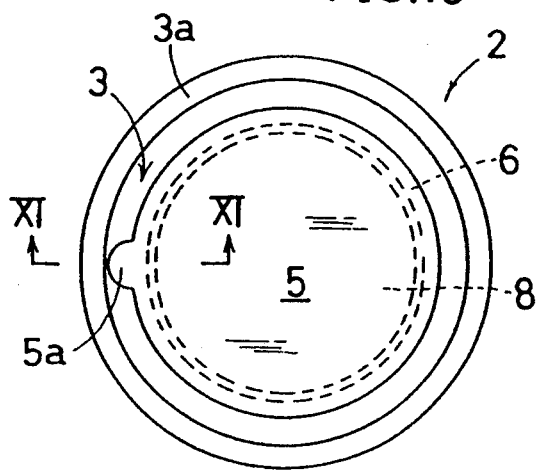
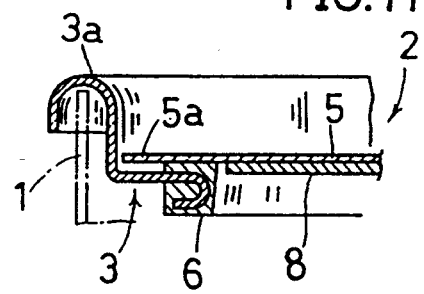
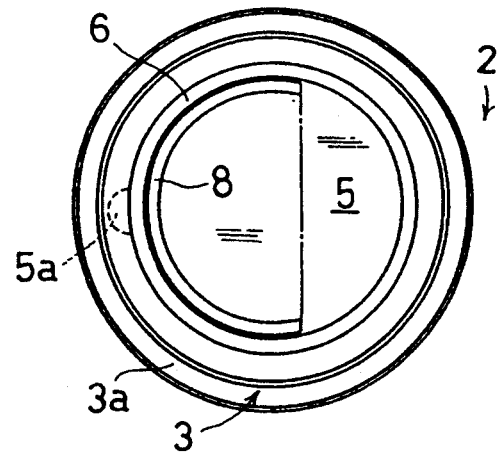
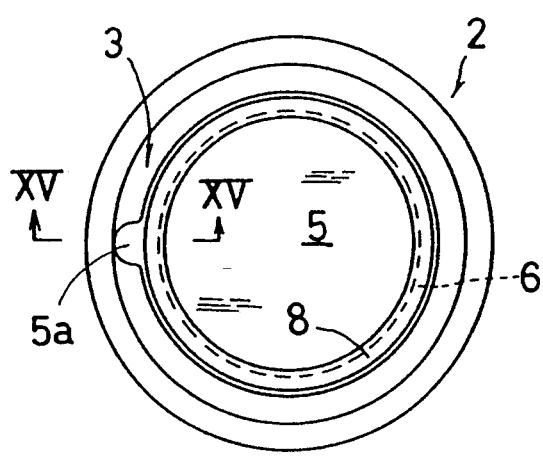
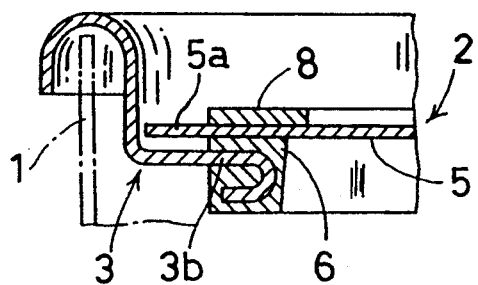
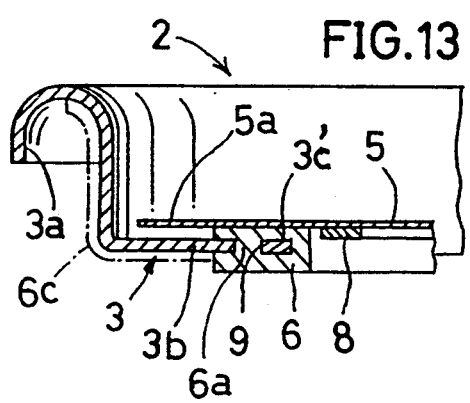

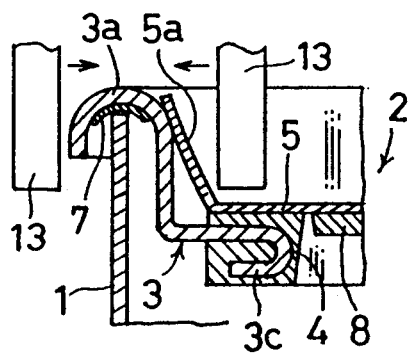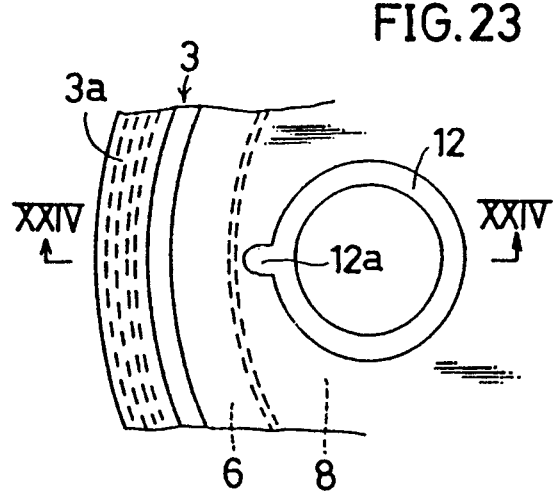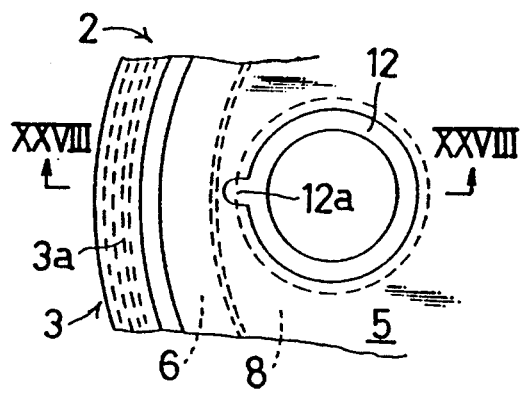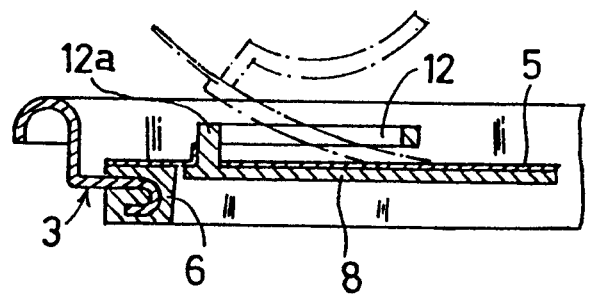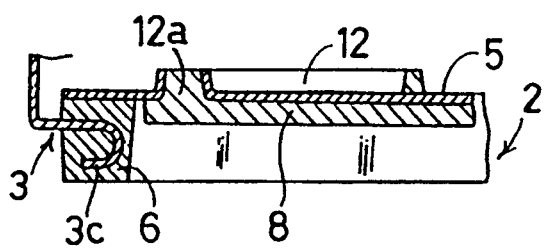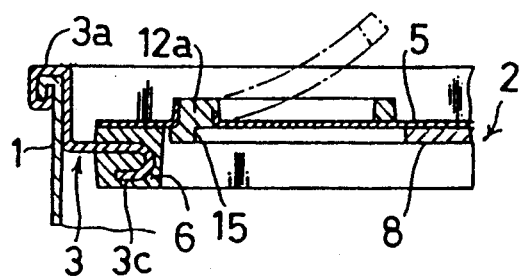

LID DEVICE FOR WIDE-MOUTHED CONTAINER AND METHOD FOR MAKING THE SAME

This is a continuation of application Ser. No. 07/870,868, filed Apr. 20, 1992.

BACKGROUND OF THE INVENTION

1. Field of the Invention

This invention relates generally to lids for containers. More particularly, the present invention relates to a lid device of the type which comprises a metallic lid body fittable to an open mouth of a wide-mouthed container and having an inner margin defining an opening, and a closure film attached to the lid body for closing the opening. The invention also relates to a method for making such a lid device.

2. Description of the Prior Art

In general, a lid device of the above-described type is made by forming a metallic plate of e.g. aluminum or tin into a predetermined shape to provide a lid body with an opening, and directly attaching a closure film (e.g. aluminum foil or resin film) to the lid body for closing the opening. In use, the closure film is peeled off the closure film to provide access into the container.

Typically, the closure film is attached to the lid body by utilizing the heat sealing method, as disclosed in U.S. Patent to Bloeck et al or Japanese Utility Model Application Laid-open No. 62-108229 (Inventors: Susumu TAKADA et al.). Specifically, according to the known heat sealing method, a bonding layer of thermally meltable adhesive or thermoplastic resin is preliminarily formed on the lid body and/or the closure film, and a hot plate is pressed against the closure film overlapped on the lid body to cause thermal fusion of the bonding layer.

The heat sealing method provides uniform attachment of the film over the entire circumference thereof as long as the lid body has a strictly flat attachment surface. In reality, however, it is difficult to make the attachment surface of the lid body strictly flat because the lid body is subjected to various forces at the time of forming from a metallic plate. Thus, the hot plate for heat sealing may pressed unevenly circumferentially of the film, which results in uneven attachment of the film. In an extreme case, the film may be left non-attached at one or more circumferential positions, which causes unexpected gas entry and/or leakage at the non-attached positions.

SUMMARY OF THE INVENTION

It is, therefore, an object of the present invention to provide a lid device for a wide-mouthed container wherein a closure film can be uniformly attached for reliably closing an opening of a metallic lid body.

Another object of the present invention to provide a lid device wherein a closure film can be opened without unexpected tearing thereof.

A further object of the present invention is to provide a method for suitably making such a lid device.

Still another object of the present invention is to provide a method for improving hermetical ability at the time of making such a lid device.

According to one aspect of the present invention, there is provided a lid device for a wide-mouthed container comprising: a metallic lid body fittable to an open mouth of the container, the lid body having an inner margin defining an opening of a predetermined shape; a resinous rim member extending entirely along and anchored to the inner margin of the lid body; and a closure film means attached to the rim member to close the opening of the lid body.

With the arrangement described above, the rim member can be molded in situ to have a strictly flat attachment surface even if the lid body itself has no strictly flat surface. Thus, the film can be uniformly attached to the flat surface of the rim member by various known methods for reliably closing the opening of the lid body.

Preferably, the closure film means may be peelably attached to an outer surface of the rim member. In this case, the closure film means may be made to have a tab portion extending beyond the rim member for facilitating manual peeling of the film means. Alternatively, the closure film means is made to have its own peripheral portion (instead of a special tab portion) extending beyond the rim member for facilitating manual peeling of the film means.

Advantageously, the lid device further comprises a resinous reinforcing member attached to the closure film means, the reinforcing member being separate from the rim member but having periphery located adjacent to the rim member. Apparently, the reinforcing member prevents unexpected tearing of the closure film means.

According to another aspect of the present invention, there is provided a method of making the lid device of the previously mentioned arrangement by using a first mold member and a second mold member, the first mold member having a rim forming cavity and a support face around the rim forming cavity, the second mold member having a film receiving cavity and a shoulder around the film receiving cavity, the method comprising the steps of: arranging the lid body and the closure film means between the first and second mold members with the closure film located between the lid body and the second mold member; bringing the first and second mold members toward each other so that the lid body is sandwiched between the support face of the first mold member and the shoulder of the second mold member; and injecting fluid resin into the rim forming cavity under pressure.

According to the method described above, the inherent stickiness and injection pressure of the fluid resin can be effectively utilized for uniformly attaching the closure film to the rim member without the necessity of subsequently performing a separate attaching step. Thus, the quality of the lid device is enhanced at lower cost.

In case the lid device is made to further incorporate a resinous reinforcing member and a pull tab integral with the reinforcing member, these components may be preferably molded together with the rim member. In this case, the overall manufacturing process can be greatly simplified to reduce the production cost.

When the inner margin of the lid body is bent to have an anchoring recess, the method may further comprises the step of compressing the rim member to reduce the width of the anchoring recess after the fluid resin hardens. This additional process step improves hermetical ability at the connection between the lid body and the rim member.

Other objects, features and advantages of the present invention will become apparent from the following detailed description of the preferred embodiments given with reference to the accompanying drawings.

BRIEF DESCRIPTION OF THE DRAWINGS

In the accompanying drawings

FIG. 10 is a plan view showing a lid device according to a third embodiment of the present invention;

FIG. 11 is a fragmentary sectional view taken along lines XI—XI in FIG. 10;

FIG. 12 is a plan view showing a lid device according to a fourth embodiment of the present invention;

FIG. 13 is a fragmentary sectional view showing a lid device according to a fifth embodiment of the present invention;

FIG. 14 is a plan view showing a lid device according to a sixth embodiment of the present invention;

FIG. 15 is a fragmentary sectional view taken along lines XV—XV in FIG. 14;

FIG. 23 is a fragmentary plan view showing a lid device according to a twelfth embodiment of the present invention;

FIG. 24 is a fragmentary sectional view taken along lines XXIV—XXIV in FIG. 23;

FIG. 25 is a fragmentary sectional view which is illustrative of the problem to be solved by the twelfth embodiment;

FIG. 26 is a fragmentary sectional view showing a lid device according to a thirteenth embodiment of the present invention;

FIG. 27 is a fragmentary plan view showing a lid device according to a fourteenth embodiment of the present invention;

FIG. 28 is a fragmentary sectional view taken along lines XXVIII—XXVIII in FIG. 27;

DETAILED DESCRIPTION OF THE PREFERRED EMBODIMENTS

Figure 1:
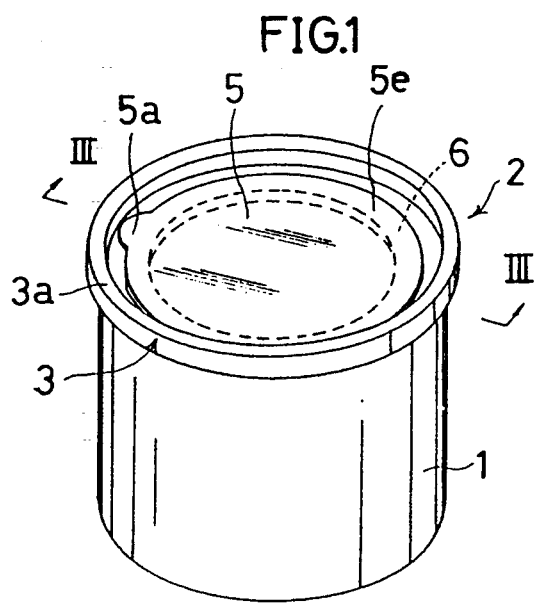
FIG. 1 is perspective view showing a wide-mouthed container which is closed by a lid device according to a first embodiment of the present invention.
Figure 2:
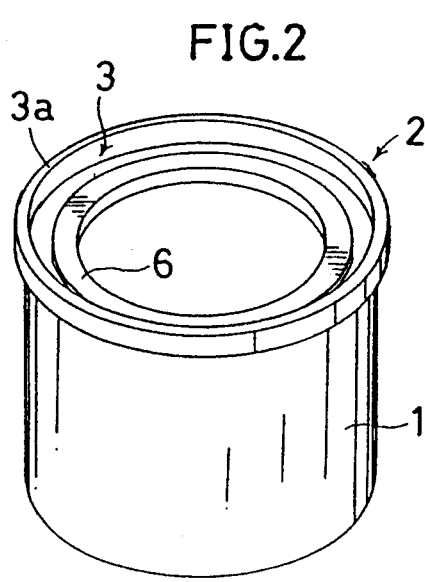
FIG. 2 is a perspective view similar to FIG. 1 but showing the container which has been opened.
Figure 3:
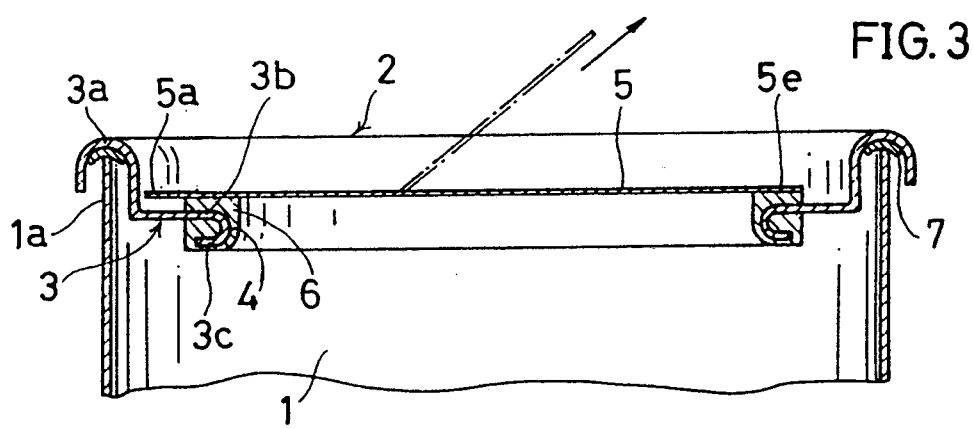
FIG. 3 is a sectional view taken along lines III—III in FIG. 1.
Figure 5:
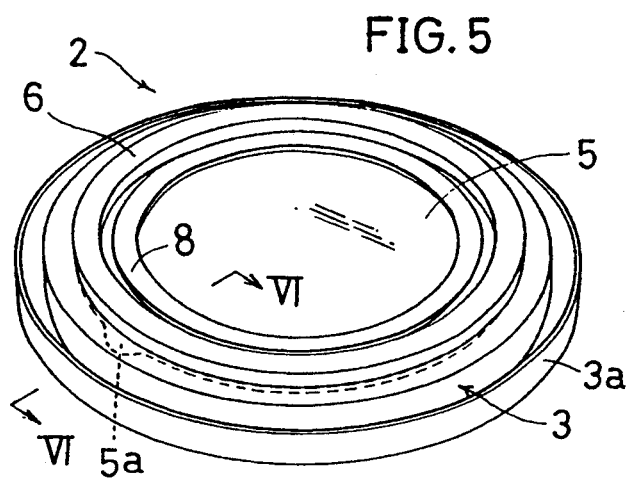
FIG. 5 is a perspective view showing a lid device, in an inverted state, according to a second embodiment of the present invention.

Referring first to FIGS. 1-4 which shows the first embodiment of the present invention, there is illustrated a wide-mouthed container 1 which is closed at its top open mouth 1a by a lid device 2. The container is bottomed and may be made of a known suitable material such as metal or synthetic resin for example.

The lid device 2 includes a lid body 3 formed to have a concentric opening 4 which is normally closed by a closure film 5. The lid body 3, which may be made of a thin metal plate, has an outer mounting margin 3a which is shaped in an inverted U for fitting to the top open mouth 1a of the container 1 by a known method such as hemming or caulking. A packing 7 made of rubber or other soft material is interposed between the lid mounting margin 3a and the container mouth 1a to hermetically seal the interior of the container.

The lid body 3 further has a flat portion 3b formed with an inner anchoring margin 3c. The anchoring margin 3c is bent radially outward into a hook shape and entirely enclosed in an annular rim member 6 which is made of relatively soft synthetic resin. Since the rim member 6 is located radially inwardly from the outer mounting margin 3a of the lid body 3, the flat portion 3b of the lid body is partially exposed.

The closure film 5 has an annular peripheral portion 5e peelably attached to the upper surface (outer surface) of the rim member 6, and a tab portion 5a projecting beyond the rim member 6. The film 5 may comprise a single layer which is made of metallic foil (e.g. aluminum foil), resin, paper and so on. Alternatively, the film 5 may comprise multiple layers which typically include a core layer 5b and two surface layers 5c, 5d attached to both surfaces of the core layer 5b by coating or bonding, as shown in FIG. 4.

Figure 4:
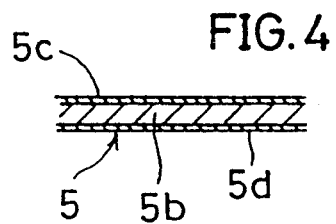
FIG. 4 is an enlarged fragmentary sectional view showing an example of closure film to be incorporated into the lid device of FIG. 1.

When the laminate structure shown in FIG. 4 is adopted for the closure film 5, the respective layers 5b–5d may be made of various materials. For instance, the core layer 5b may be made of tough paper (e.g. milk carton paper), whereas the surface layers 5c, 5d may be made of metallic foil (e.g. aluminum foil) or synthetic resin (e.g. polyethylene terephthalate). Alternatively, the core layer 5b may be made of aluminum foil, whereas the surface layers 5c, 5d may be made of synthetic resin. Indeed, the materials for the respective layers 5b–5d may be optionally selected depending on various requirements which include gas-imperviousness, printing capability, disposability after use, and so on.

The closure film 5 may be attached to the rim member 6 by various methods. For example, the film 5 is made to have a peripheral portion provided with hot-melt resin or adhesive which is thermally fused for attachment to the rim member 6. Thermal fusing of the hot-melt resin may be performed by utilizing a heating plate (as in the heat sealing method), a microwave generator (as in the high-frequency sealing method), or a supersonic generator (as in the supersonic sealing method). Obviously, in such thermal fusing, the rim member 6 itself can be partially fused for uniform attachment to the film 5 even if the flat portion 3b of the lid body 3 does not have strict flatness.

Alternatively, the inherent stickiness of the rim member 6 itself may be utilized for attachment to the closure film 5. Specifically, the rim member 6 has a certain degree of stickiness at the time of molding from fluid resin, so that the film 5 can be attached to the rim member 6 by introducing the film into a mold at the time of forming the rim member, as more concretely described later with reference to FIGS. 29–31. In this case, the pressure of the fluid resin upon injection acts uniformly to realize uniform attachment of the film 5 relative to the rim member 6.

To strengthen the attachment of the film 5 relative to the rim member 6, the film as a whole (in the case of having a single layer structure) or the bottom surface layer 5d of the film (in the case of having the laminate structure of FIG. 4) may be made of the same resinous material as the rim member 6. Further, the surfaces of the lid body 3 may be coated with a resinous material (preferably identical to that for the rim member 6), thereby strengthening fixation of the rim member 6 relative to the lid body 3.

Obviously, the lid device 2 can be easily opened by manually pulling up the tab portion 5a of the closure film 5. As a result, the film is peeled off the rim member 6 which itself is firmly fixed to the bent inner anchoring margin 3c of the lid body 3. The remaining rim member 6 serves as a safe guide at the time of manually taking out the content of the opened container 1.

FIGS. 5–8 shows a lid device 2 according to the second embodiment of the present invention. Similarly to the first embodiment, the lid device of the second embodiment includes a lid body 3, a closure film 5, and a rim member 6. However, the lid device of the second embodiment additionally includes a peripheral reinforcing member 8 which is in the form of a ring attached to the inner surface of the film 5 and slightly spaced from the rim member 6 by a small amount e (see FIG. 6).

Figure 9:
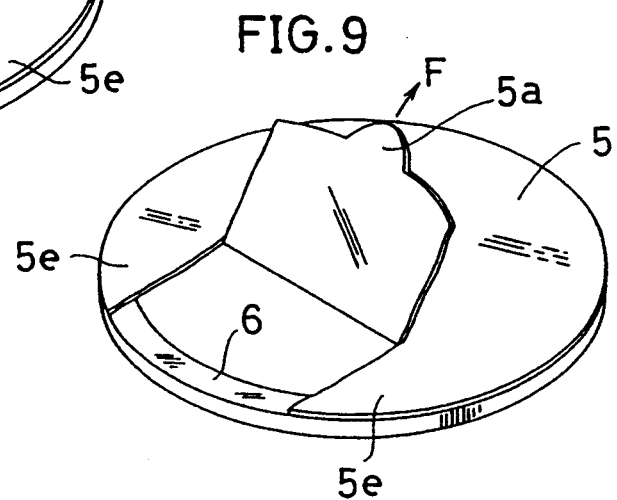
FIG. 9 is a perspective view which is illustrative of the problem to be solved by the second embodiment.

At the time of peeling the film 5 off the rim member 6, a pulling force F (see FIG. 8) acts concentratively at the tab portion 5a and is directed radially of the film, whereas peeling of the film occurs circumferentially. Therefore, the tensile direction and the peeling direction do not coincide to result in generation of a tearing force. Thus, if the film has no peripheral reinforcement, the film may be torn in the tensile direction to result in incomplete opening of the lid device, as shown in FIG. 9. This problem is particularly remarkable if the film is made entirely or mainly of a weak material such as paper or if the film is extremely thin.

The reinforcing member or ring 8 reinforces the peripheral portion 5e of the film 5 to effectively prevent unexpected tearing of the film at the time of peeling. As a result, the lid device can be opened completely at all times. Preferably, the annular gap e (FIG. 6) should be as small as possible.

FIGS. 10 and 11 show a lid device 2 according to the third embodiment of the present invention. The lid device of the third embodiment includes a reinforcing member 8 which is discal instead of annular.

Obviously, the discal reinforcing member 8 provides an increased area for attachment to the film 5. Thus, the film is prevented not only from tearing but also from sagging in its central portion even if the film is thin.

FIG. 12 shows a lid device 2 according to the fourth embodiment of the present invention. The lid device of the fourth embodiment differs from that of the second embodiment (FIGS. 5–8) only in that the reinforcing member 8 is arcuate. Alternatively, the reinforcing member may be generally semicircular, as indicated by a chain line in FIG. 12.

The problem of tearing is most likely to occur at the time of starting peeling the film 5 because the tensile force is applied locally at the tab portion 5a. No such tearing occurs when the peeling operation proceeds beyond the half way. Thus, the reinforcing member 8 need not be completely annular or discal.

FIG. 13 shows a lid device 2 according to the fifth embodiment of the present invention. The lid device of the fifth embodiment is similar to that of the second embodiment (FIGS. 5–8) or the third embodiment (FIGS. 10 and 11) but differs only in the following points.

Figure 6:
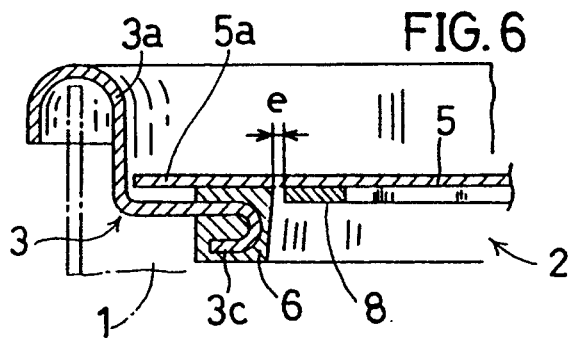
FIG. 6 is a fragmentary sectional view taken along lines VI—VI in FIG. 5.
Figure 7:
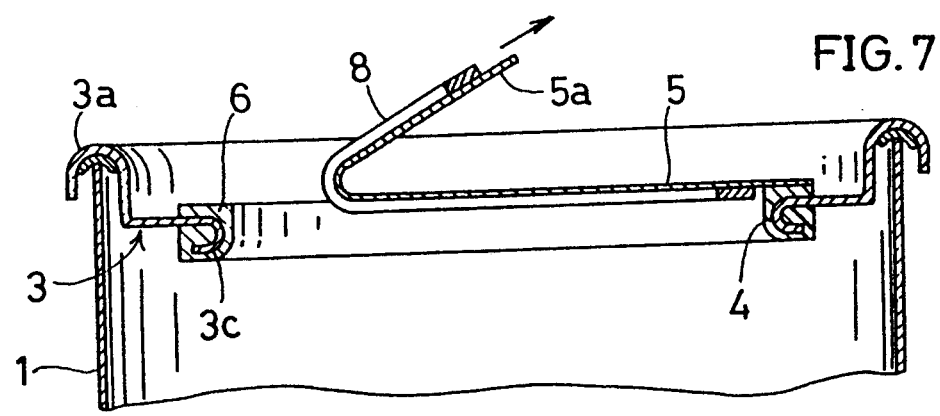
FIG. 7 is a sectional view showing the lid device of FIG. 5 in its partially opened state.
Figure 8:
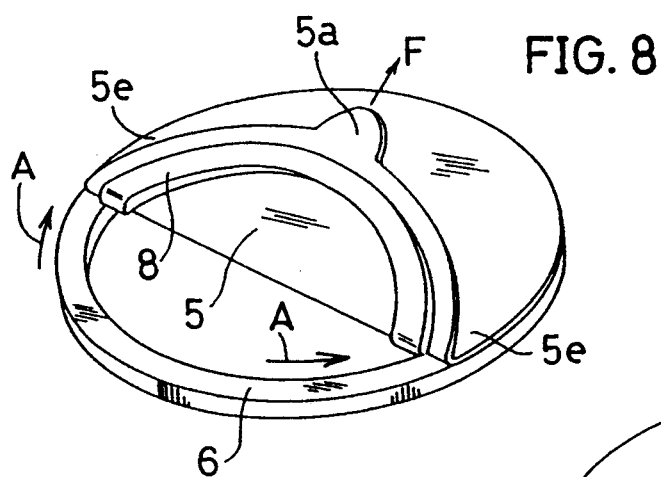
FIG. 8 is a perspective view showing a principal portion of the lid device of FIG. 5 in its partially opened state.

Specifically, the flat portion 3b of the lid body 3 is made to have a flat inner anchoring margin 3c' instead of a bent inner anchoring margin (see 3c in FIG. 6). The flat inner margin 3c' of the lid body is formed with an annular series of anchoring perforations 9 (only one shown) spaced circumferentially of the lid body. On the other hand, the rim member 6 has an interior fitting portion 6a received in each anchoring perforation 9. Preferably, the rim portion 6 may be formed with an integral extension 6c extending into the outer mounting portion 3a of the lid body 3.

According to the fifth embodiment, the inner margin 3c' of the lid body 3 need not be bent. Nevertheless, the rim member 6 can be firmly anchored to the lid body inner anchoring margin 3c' by the engagement between the anchoring perforations 9 and the interior fitting portion 6a. Further, since the inner margin 3c' is completely enclosed in the rim member 6, the sharp edge of the inner margin 3c' does not come into injuring contact with the user's hand introduced into the container for taking out the content.

The integral extension 6c provides an increased attachment area relative to the lid body 3, thereby providing reliable sealing between the lid body 3 and the rim member 6. Further, since the integral extension 6c itself can also serve to seal between the lid body 3 and the container (not shown in FIG. 13), it is unnecessary to provide a separate packing.

FIGS. 14 and 15 represent a lid device 2 according to the sixth embodiment of the present invention. The lid device of this embodiment is similar to that of the second embodiment (FIGS. 5-8) except that the reinforcing member or ring 8 is attached to the closure film 5 outside the container 1 and located to substantially overlap the rim member 6.

Obviously, the tearing preventing function of the reinforcing member 8 is improved when it is attached to the outer surface of the closure film 5, because the film tap portion 5a upon pulling up for peeling comes into stopping engagement with the reinforcing member 8. Further, the tearing preventing function of the reinforcing member 8 is additionally improved by the fact that it substantially overlaps the rim member 6 because the diameter of the rim member 6 (i.e., the reinforcing member 8) corresponds substantially to that of the closure film 5.

Of course, the externally arranged reinforcing member 8 shown in FIGS. 14 and 15 may be positioned radially inwardly from the rim member 6. Further, the reinforcing member 8 may be discal, arcuate or semicircular. In case the closure film 5 carries printed information, the reinforcing member 8 may be made of transparent resin to enable visual recognition of the printed information under the reinforcing member.

Figure 16:
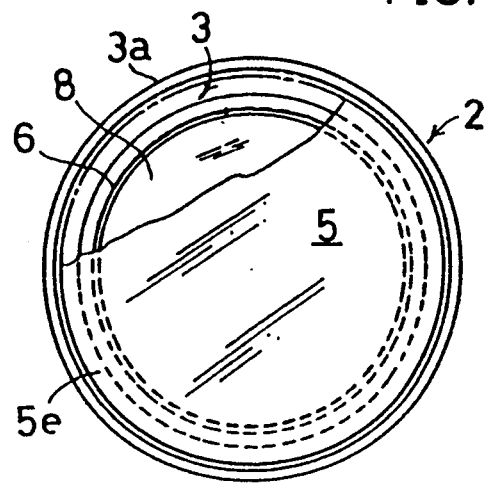
FIG. 16 is a plan view showing a lid device according to a seventh embodiment of the present invention.

FIG. 16 illustrates a lid device 2 according to the seventh embodiment of the present invention. The lid device of this embodiment comprises a closure film 5 which is made to have an entire peripheral portion 5e extending beyond the rim member 6. The lid device further includes a discal reinforcing member 8 attached to the inner surface of the closure film 5.

According to the seventh embodiment of FIG. 16, the closure film 5 has no tab portion. Instead, peeling of the film 5 may be started at any circumferential position by utilizing the excess peripheral portion 5e of the film. Of course, the discal reinforcing member 8 may be replaced by a reinforcing ring attached to the outer surface of the film 5 near the excess peripheral portion 5e thereof.

Figure 17:
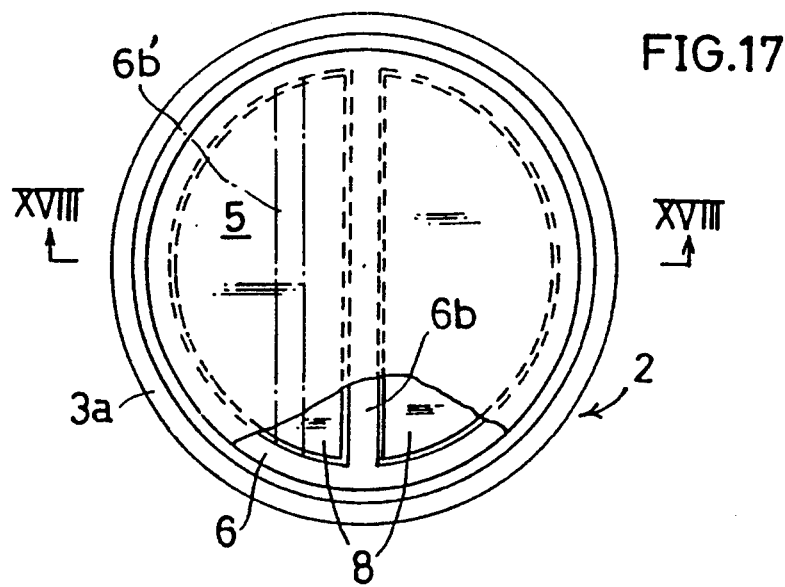
FIG. 17 is a plan view showing a lid device according to an eighth embodiment of the present invention.
Figure 18:
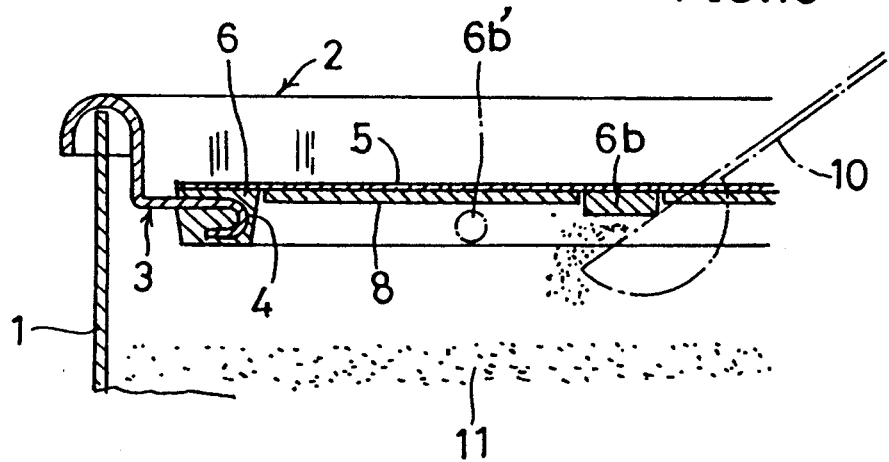
FIG. 18 is a fragmentary sectional view taken along lines XVIII—XVIII in FIG. 17.

FIGS. 17 and 18 show a lid device 2 according to the eighth embodiment of the present invention. In this embodiment, the rim member 6 has an integral scraping strip 6b extending transversely of the rim member. As a result, the opening 4 of the lid body 3 is divided into two sections which are equally closed by a single closure film 5 attached to the rim member 6 including the scraping strip 6b. A pair of generally semicircular reinforcing members 8 are attached to the inner surface of the closure film 5 at the respective divided sections of the lid body opening 4.

It is now assumed that the container 1 contains powder or Granular material 11 (see FIG. 18) such as milk powder which is scooped by a spoon 10 after peeling off the closure film 5. The scraping strip 6b may be utilized to scrape off an excess portion of the thus scooped powder, thereby enabling to take out a predetermined amount of powder upon every scooping.

The scraping strip 6b shown in FIGS. 17 and 18 may be replaced by a scraping rod 6b' (indicated by chain lines in FIGS. 17 and 18) which is spaced from the film 5 without direct attachment thereto. Further, the single film 5 may be replaced by a pair of separate films corresponding to the respective divided sections of the lid body opening 4.

Figure 19:
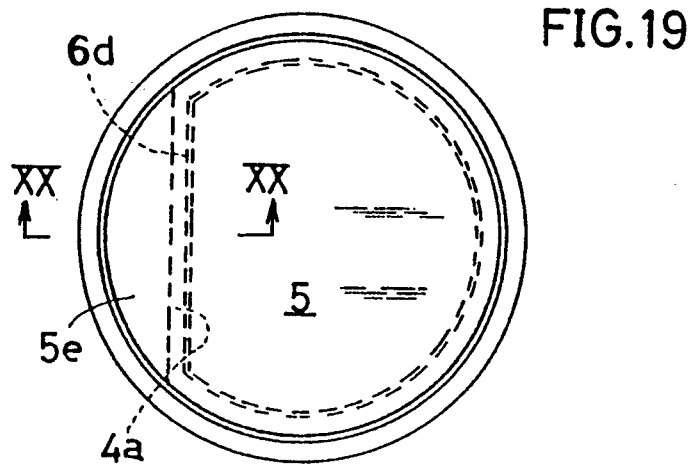
FIG. 19 is a plan view showing a lid device according to a ninth embodiment of the present invention.
Figure 20:
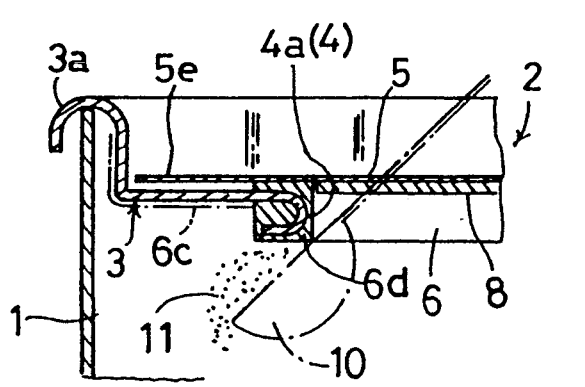
FIG. 20 is a fragmentary sectional view taken along lines XX—XX in FIG. 19.

FIGS. 19 and 20 represent a lid device 2 according to the ninth embodiment of the present invention. In this embodiment, the lid body 3 is shaped to have an opening 4 which includes a straight portion 4a, and the rim member 6 is similarly made to have a straight portion 6d. Apparently, the straight portion 6d of the rim member may be utilized for scraping powder material 11 scooped by a spoon 10 after peeling off the closure film.

In the ninth embodiment of FIGS. 19 and 20, the closure film 5 is entirely circular, so that it has a peripheral portion 5e located beyond the straight portion 6d of the rim member 6 to serve as a tab for peeling off the film. Preferably, the rim member 6 may be made to have an integral outward extension 6c for reliable sealing without using a separate packing.

Figure 21:
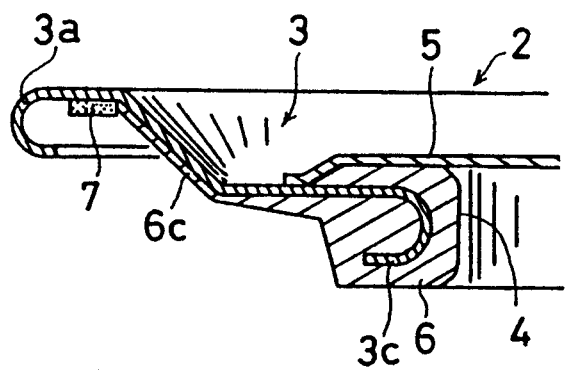
FIG. 21 is a fragmentary sectional view showing a lid device according to a tenth embodiment of the present invention.

FIG. 21 shows a lid device 2 according to the tenth embodiment of the present invention. In this embodiment, the rim member 6 is made to have an integral extension 6c which is also formed integrally with a packing 7'.

In the tenth embodiment of FIG. 21, the rim member 6 (with the integral extension 6c) and the packing 7' may be simultaneously formed in a single molding step. During the molding step, fluid resin (e.g. polyethylene) for the rim member 6 is fused to different fluid material (e.g. rubber) for the packing 7'.

Obviously, the rim member 6 alone can provide reliable sealing between the lid body 3 and the rim member 6 as well as between the lid body 3 and the container (not shown in FIG. 21), as already described in connection with FIG. 13. The packing 7 additionally improves sealing between the lid body 3 and the container.

Figure 22:
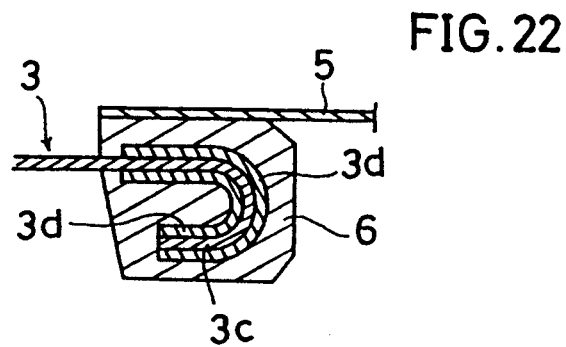
FIG. 22 is a fragmentary sectional view showing a lid device according to an eleventh embodiment of the present invention.

FIG. 22 illustrates a lid device 2 according to the eleventh embodiment of the present invention. In this embodiment, the bent inner anchoring margin 3c is covered, on both surfaces, with adhesive layers 3d prior to forming the rim member 6. The material for the adhesive layers 3d is selected so that it provides excellent adhesion both to the metallic lid body 3 and the resinous rim member 6. Obviously, the additional provision of the adhesive layers 3d improves sealing between the lid body 3 and the rim member 6 in addition to enhancing fixation of the rim member.

FIGS. 23 and 24 show a lid device 2 according to the twelfth embodiment of the present invention. The lid device of this embodiment is similar to that of the third embodiment shown in FIGS. 10 and 11 but differs therefrom only in the following points.

First, the closure film 5 has no tab portion extending beyond the rim member 6. Instead, the discal reinforcing member 8 has an integral pull tab 12 located outside the container (not shown in FIGS. 23 and 24). The pull tab 12 is slightly spaced from the film 5 and has a base portion 12a penetrating through the film 5 for integral connection to the reinforcing member 8 at a position close to the rim member 6.

The closure film 5 may be peeled off the rim member 6 simply by pulling up the pull tab 12. The provision of the pull tab 12 is particularly advantageous when the rim member 6 is located close to the outer mounting portion 3a of the lid body 3. The reason for this is described below with reference to FIG. 25.

As shown in FIG. 25, it is now assumed that the closure film 5 has a tab portion 5a. On this assumption, if the rim member 6 is located close to the outer mounting portion 3a of the lid body 3 (that is; when the opening 4 of the lid body 3 is large), the tab portion 5a of the film 5 may rest against the outer mounting portion 3a of the lid body because the tab portion 5a must extend beyond the rim member 6 to a certain degree to enable manual clipping. Thus, when the outer mounting portion 3a of the lid body 3 is clamped by a pair of clamping members 13 for fixation to the container 1, the tab portion 5a may be simultaneously clamped to be completely or partially torn off the remainder of the closure film 5. As a result, it becomes impossible or difficult to perform subsequent peeling of the closure film.

Due to the pull tab 12 integral with the reinforcing member 8, the closure film 5 itself need have no tab portion. Further, the pull tab 12 can be located completely clear of the clamping members 13. Thus, it is possible to completely eliminate the problem described above.

The pull tab 12 of the reinforcing member 8 may be in the form of a ring, as shown in FIGS. 23 and 24. However, the pull tab 12 may be T-shaped or otherwise shaped. Further, the pull tab 12 may be a separate member which is subsequently connected to the reinforcing member 8 by suitable means.

FIG. 26 shows a lid device 2 according to the thirteenth embodiment of the present invention. The lid device of this embodiment is similar to that of the twelfth embodiment (FIGS. 23 and 24) but differs therefrom only in that the pull tab 12 is normally held in intimate contact with the outer surface of the closure film 5.

Obviously, the pull tab 12 thus held in contact with the closure film 5 is less likely to come into accidental engagement with external objects. Thus, the lid device of the thirteenth embodiment can be handled more conveniently than that of the twelfth embodiment.

FIGS. 27 and 28 represent a lid device 2 according to the fourteenth embodiment of the present invention. The lid device of this embodiment is similar to that of the thirteenth embodiment (FIG. 26) but differs therefrom only in that the reinforcing member 8 has a cutout 15 at a position corresponding to the pull tab 12. The cutout 15 is provided for manufacturing purposes, as described later with reference to FIG. 36.

In either of the embodiments shown in FIGS. 26–28, the pull tab 12 is normally held in intimate contact with the closure film 5. However, the pull tab 12 must be separable from the film to enable subsequent pulling up. For this purpose, the outer surface of the film 5 may be coated with a chemical which prevents adhesion of the pull tab 12 at the time of molding from fluid resin. Alternatively, the film 5 may have an outer surface layer 5c (see FIG. 4) whose material is selected so that the pull tab 12 does not stick to the surface layer 5c (made of e.g. nylon) at the time of molding from fluid resin (e.g. polypropylene).

Figure 29:
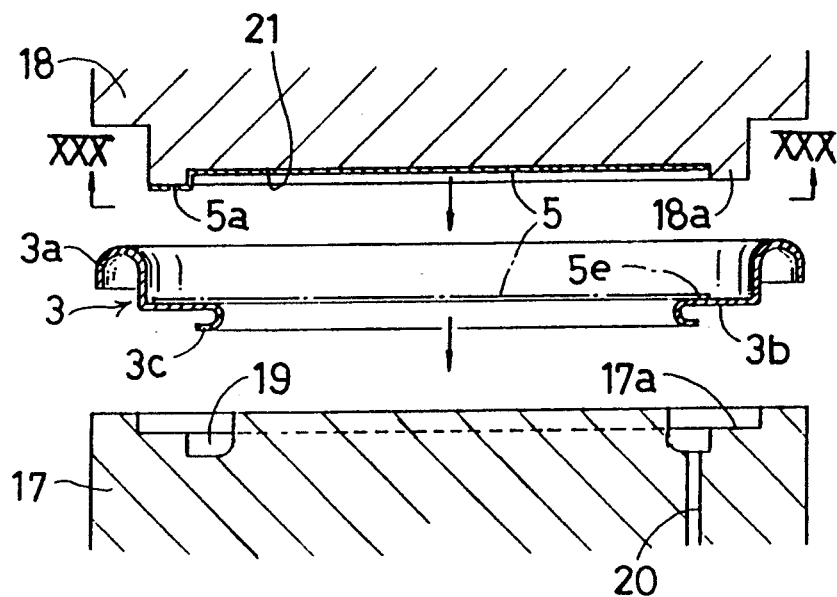
FIG. 29 is a sectional view showing a mold used in a method for making the lid device according to the first embodiment illustrated in FIGS. 1 to 4.
Figure 30:
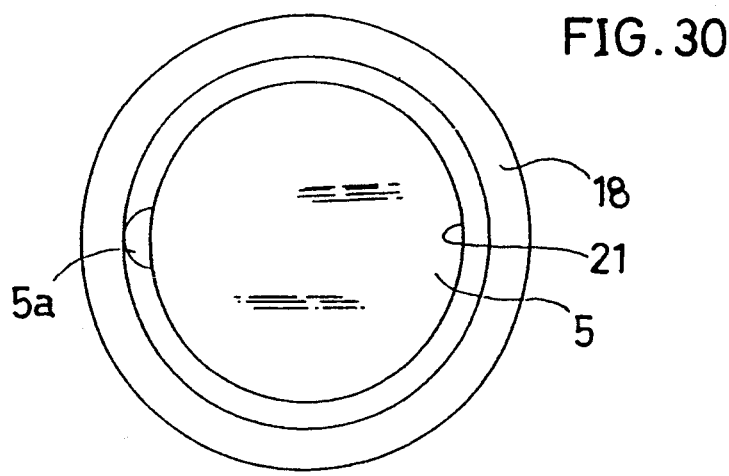
FIG. 30 is a view showing the same mold as seen in the direction of arrows XXX—XXX in FIG. 29.
Figure 31:
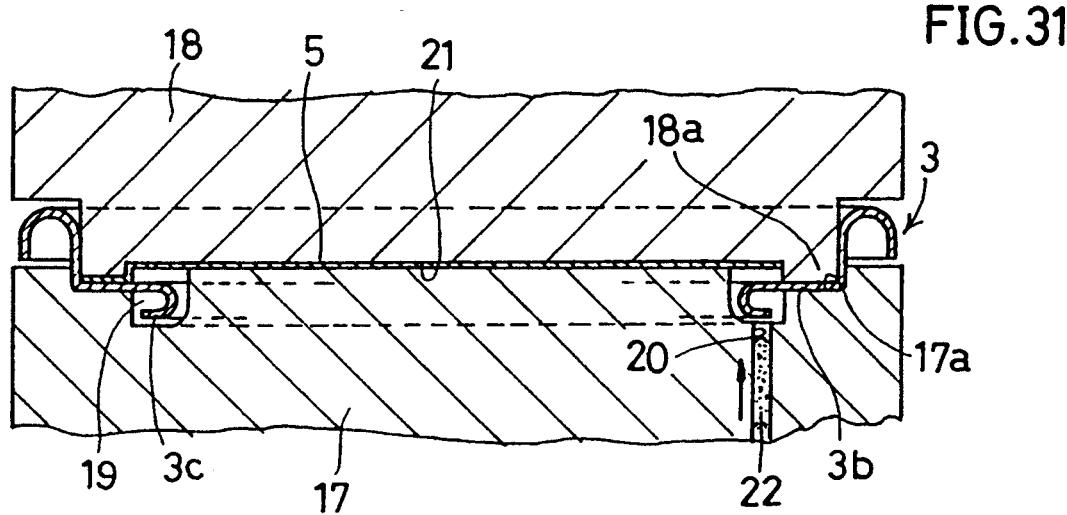
FIG. 31 is a sectional view showing the same mold in its closed condition.

FIGS. 29–31 illustrate a method for making the lid device shown in FIGS. 1–4 (first embodiment). The illustrated method utilizes a first mold member 17 and a second mold members 18.

The first, mold member 17 has an annular rim forming cavity 19 and an annular support face 17a arranged immediately around the rim forming cavity 19. The first mold member further has a runner or sprue 20 communicating with the rim forming cavity 19.

The second mold member 18 has a central film receiving cavity 21 and an annular shoulder 18a located immediately around the film receiving cavity 21. The annular shoulder 18a of the second mold member 18 corresponds in position to the annular support face 17a of the first mold member 17.

In manufacture, the closure film 5 is directly held in the film receiving cavity 21 of the second mold member 18 by applying vacuum for example, as shown in FIG. 29. In this condition, the tab portion 5a of the film 5 rests on the annular shoulder 18a. Instead, the tab portion 5a may be folded behind the film within the film receiving cavity 21, so that the tab portion 5a is completely concealed by the film. The application of vacuum may be performed through holes (not shown) formed in the second mold member. Alternatively, the film may be held in the film receiving cavity 21 by utilizing electrostatic attraction between the film (negatively charged for example) and the second mold member 18 (positively charged for example).

Then, the flat portion 3b of the lid body 3 is interposed between the support face 17a of the first mold member 17 and the annular shoulder 18a of the second mold member 18. In this condition, fluid resin 22 is injected under pressure into the rim forming cavity 19 of the first mold member 19 through the runner 20.

Upon hardening, the injected resin 22 provides the rim member 6 which encloses the bent inner anchoring margin 3c and is attached to the film 5 by utilizing the inherent stickiness of the fluid resin. On the other hand, since the tab portion 5a of the film 5 is interposed between the lid body 3 and the annular shoulder 18a of the second mold member 18 (or concealed behind the film), the film tab portion 5a remains non-attached for enabling subsequent peeling of the film. Further, the forceful interposition of the flat portion 3b of the lid body between the annular support face 17a of the first mold member 17 and the annular shoulder 18a of the second mold member 18 makes it possible to prevent flash formation at the time of molding the rim member.

According to the method described above, the injection pressure of the fluid resin 22 acts uniformly on the film 5 at the rim forming cavity 19. Thus, the inherent stickiness of the fluid resin can be effectively utilized for uniformly attaching the film 5 to the rim member 6 (see FIGS. 1–4) without the necessity of performing a separate film attaching step. Further, such uniform attachment of the film is realizable even if the thickness of the film is relatively large and uneven. On the other hand, the use of thermal fusing may result in uneven and/or slow attachment when the film is excessively thick.

The film 5 may be supplied to the film receiving cavity 21 of the second mold member 18 by a vacuum suction collet (not shown) which picks it up from a stack of such films and transfers it to the location of the second mold member. Indeed, the use of the suction collet is enabled because the film, which is subsequently attached to the rim member 6 by utilizing the inherent stickiness of the fluid resin 22, may be thick enough to enable proper suction pick-up.

Instead of directly placing the closure film 5 in the film receiving cavity 21 of the second mold member 18, the film 5 may be provisionally attached to the lid body 3 by relatively weak adhesive applied to the annular peripheral portion 5e of the film, as indicated by phantom lines in FIG. 29. In this case, the film may be kept taut even if it is relatively thin, so that the film together with the lid body 3 may be transported to the location of molding by using a vacuum suction collet. Obviously, the film comes off the lid body under the pressure of the injected fluid resin 22 at the time of molding the rim member 6.

Figure 32:
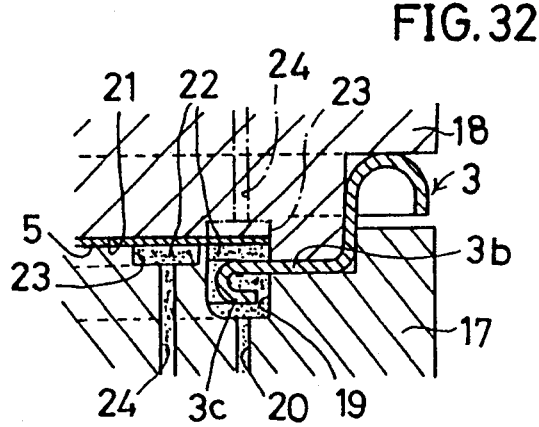
FIGS. 32 and 33 are views showing a method for making the lid device according to the second embodiment illustrated in FIGS. 5 to 8.
Figure 33:
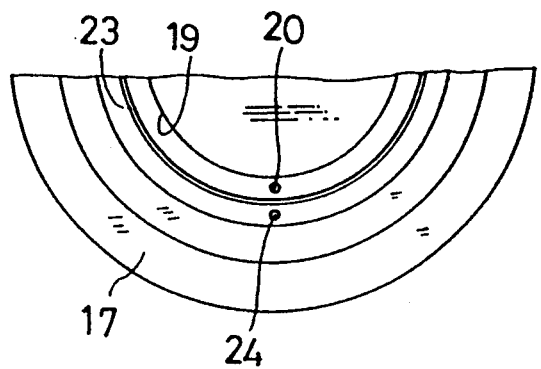

FIGS. 32 and 33 illustrate a method which is suitable for making the lid device shown in FIGS. 5-8 (second embodiment). The method of this embodiment is similar to that of FIGS. 29-31 but differs therefrom only in that the first mold member 17 additionally has an annular reinforcement forming cavity 23 and a runner 24 communicating with the cavity 22.

In manufacture, fluid resin 22 is injected under pressure through the respective runners 20, 23. As a result, the ring-form reinforcing member 8 and the annular rim member 6 (see FIGS. 5-8) are simultaneously formed and attached to the film 5 in a single molding step, so that the manufacturing process is greatly simplified to reduce the production cost.

Obviously, the configuration of the reinforcement forming cavity 23 may be modified so that the molded reinforcing member 8 becomes discal (third embodiment of FIGS. 10 and 11), arcuate or semicircular (fourth embodiment of FIG. 12). The lid device shown in FIG. 13 (fifth embodiment) may be made by using substantially the same mold members as shown in FIGS. 32 and 33.

Instead of the first mold member 17, the second mold member 18 may be modified to have a reinforcement forming cavity 23 in communication with a runner 24, as indicated by chain lines in FIG. 32. In this case, the lid device shown in FIGS. 14 and 15 (sixth embodiment) will result.

The lid device shown in FIG. 16 (seventh embodiment) may be obtained simply by interposing the entire peripheral portion 5e of the film 5 between the flat portion 3b of the lid body 3 and the annular shoulder 18a of the second mold member 18. Further, the lid device shown in FIGS. 17-18 (eighth embodiment) or 19-20 (ninth embodiment) may be obtained simply by modifying the configuration of the rim forming cavity 19 and the reinforcement forming cavity 23.

Of course, the reinforcing member 8 may be separately prepared and later attached to the film 5 by adhesive which is curable by drying, heating or ultraviolet radiation. Alternatively, the separately prepared reinforcing member 8 may be attached to the film 5 by the heat sealing method or any other method.

Figure 34:
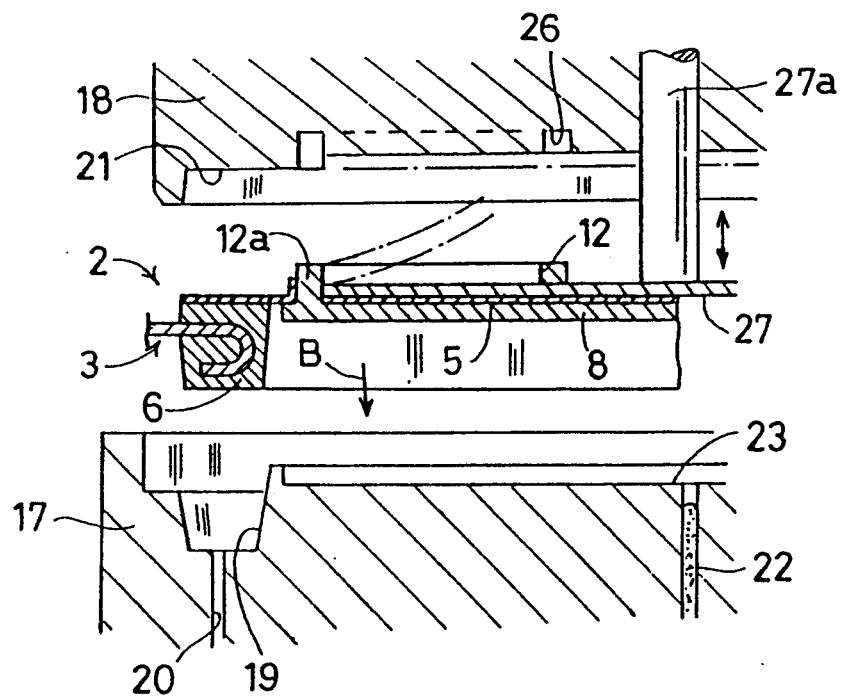
FIG. 34 is a fragmentary sectional view showing a method for making the lid device according to the twelfth embodiment illustrated in FIGS. 23 and 24.

FIG. 34 shows a method for suitably making the lid device shown in FIGS. 23 and 24 (twelfth embodiment). The first and second mold members 17, 18 used in this method are similar to those shown in FIGS. 29-31 except for the following points.

Specifically, the first mold member 17 has a circular reinforcement forming cavity 23 in communication with a runner 24 for forming the discal reinforcing member 8, whereas the second mold member 18 has an annular tab forming cavity 26 for forming the pull tab 12. Further, the second mold member 18 slidably carries a shaft 27a of a movable spacer plate 27 which, when retracted into the film receiving cavity 21, closes the tab forming cavity 26 except for a portion thereof corresponding to the base portion 12a of the pull tab.

In manufacture, the lid body 3 and the closure film 5 are arranged between the respective mold members 17, 18 (as already described) with the spacer plate 27 retracted in the film receiving cavity 21 of the second mold member 18. In this condition, fluid resin 22 is injected under pressure through the respective runners 20, 24 to fill the rim forming cavity 19 and the reinforcement forming cavity 23. At the time of filling the reinforcement forming cavity 23, the fluid resin 22 penetrates the film 5 at the non-closed portion of the tab forming cavity 26 and fills the cavity 26 to form the pull tab 12 behind the spacer plate 27. Upon hardening of the resin 22, the respective mold members 17, 18 are separated, and the spacer plate 27 is protracted from the film receiving cavity 21. Thereafter, the obtained lid device 2 is pulled away from the second mold member 18 (in the direction indicated by an arrow B). As a result, the molded pull tab 12 is elastically deformed to enable complete removal of the lid device 2.

According to the method shown in FIG. 34, the rim member 6, the discal reinforcing member 8 and the pull tab 12 are all molded simultaneously in a single molding step. Thus, the lid device 2 of the twelfth embodiment can be manufactured very efficiently at a low cost.

Figure 35:
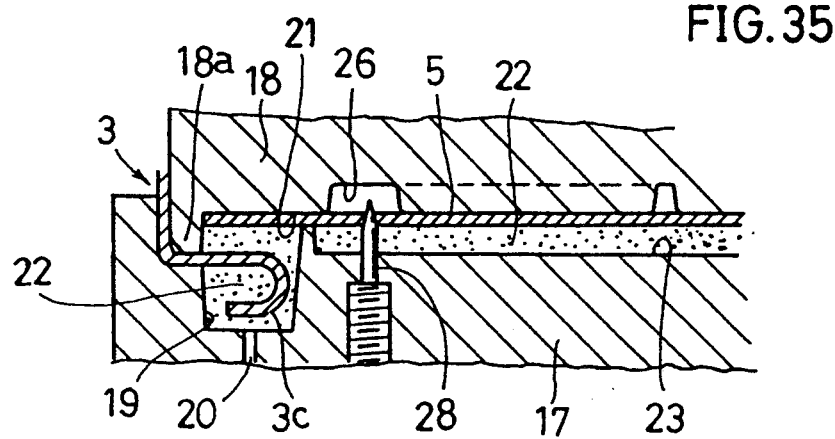
FIG. 35 is a fragmentary sectional view showing a method for making the lid device according to the thirteenth embodiment illustrated in FIG. 26.

FIG. 35 shows a method for suitably producing the lid device shown in FIG. 26 (thirteenth embodiment). The first and second mold members 17, 18 used in this method are similar to those used in the method of FIG. 34 but differs therefrom in the following respects.

Specifically, the tab forming cavity 26 of the second mold member 18 is formed in a manner such that it directly faces (opens toward) the closure film 5 held in the film receiving cavity 21. Thus, the spacer plate 27 shown in FIG. 34 is omitted. On the other hand, the first mold member 17 carries a needle 28 which is projectable into the tab forming cavity 26 to perforate the film 5 at a position thereof corresponding to the base portion 12a of the pull tab 12 (see FIG. 26) when the respective mold members 17, 18 are closed. The needle 28 may be fixedly carried by the first mold member 17. However, it is preferable that the needle 28 be slidably carried by the first mold member 17, whereby the needle 28 can be retracted behind the reinforcement forming cavity 23 after perforating the film 5 but before resin injection.

In molding, fluid resin 22 is made to fill the rim forming cavity 19 and the reinforcement forming cavity 23. The fluid resin 22 further penetrates through the film 5 at the previously perforated position and fills the tab forming cavity 26 to form the pull tab 12 in contact with the film 5, as shown in FIG. 26.

In the method of FIG. 35, since the molded pull tab 12 (FIG. 26) is held in intimate contact with the closure film 5, the outer surface of the film need be previously coated with a release agent to prevent the tab from being held stuck to the film. Alternatively, the film may be made to have an outer surface layer 5c (FIG. 4) which is non-adhesive relative to the fluid resin 22.

The method of FIG. 35 is advantageous at least in four respects. First, the absence of the spacer plate 27 (FIG. 34) simplifies the structure of the second mold member 18. Secondly, due to the absence of the spacer plate, the molded pull tab 12 (FIG. 26) need not be elastically deformed at the time of taking out the product, thereby reducing the likelihood of damaging the product. In the third place, since the film 5 is forcibly perforated by the needle 28, it is possible to prevent the fluid resin 22 from penetrating the film at an improper position. In the fourth place, due to forcible perforation of the film 5, integral formation of the pull tab 12 is possible even if the film has such a thickness that cannot be penetrated by the injection pressure of the fluid resin 22 alone.

Figure 36:
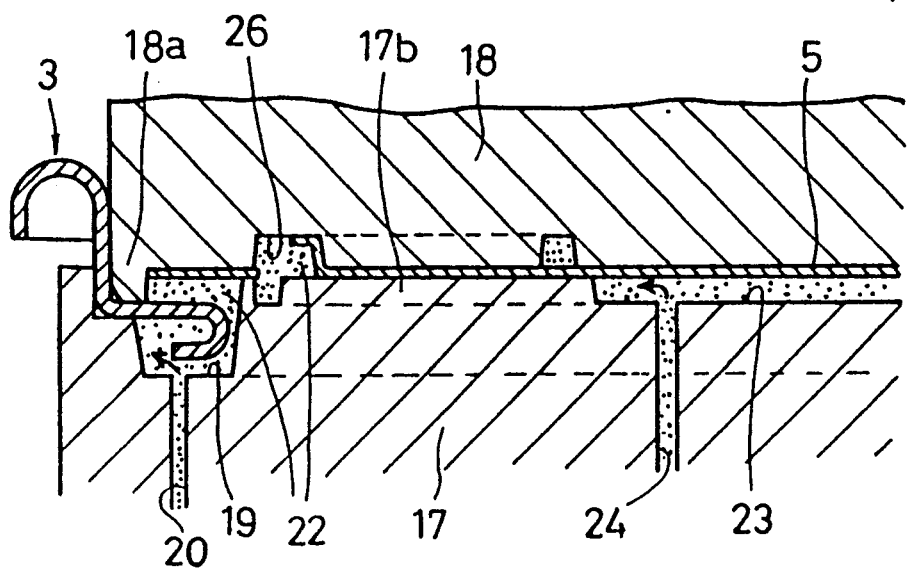
FIG. 36 is a fragmentary sectional view showing a method for making the lid device according to the fourteenth embodiment illustrated in FIGS. 27 and 28.

FIG. 36 shows a method suitable for making the lid device illustrated in FIGS. 27 and 28 (fourteenth embodiment). The second mold member 18 used in this method is similar to that used for the method of FIG. 35.

On the other hand, the first mold member 17 used in the method of FIG. 36 has a film supporting island 17b at a portion corresponding to the cutout 15 of the discal reinforcing member 8 (see FIG. 28) subsequently molded, but no needle is provided for the first mold member. The configuration of the film supporting island 17b is such that it closes the tab forming cavity 26 except for a portion corresponding to the tab base portion 12a (FIG. 28).

According to the method of FIG. 36, the fluid resin 22 injected under pressure can penetrate the film 5 only where the film supporting island 17b does not close the tab forming cavity 26. If the film supporting island 17b is absent, the film 5 may be penetrated along the entire tab forming cavity 26, so that the resulting tab is not workable for pulling purposes. Obviously, the presence of the film supporting island 17b results in formation of the cutout 15 (FIG. 28) in the discal reinforcing member 8.

Figure 37:
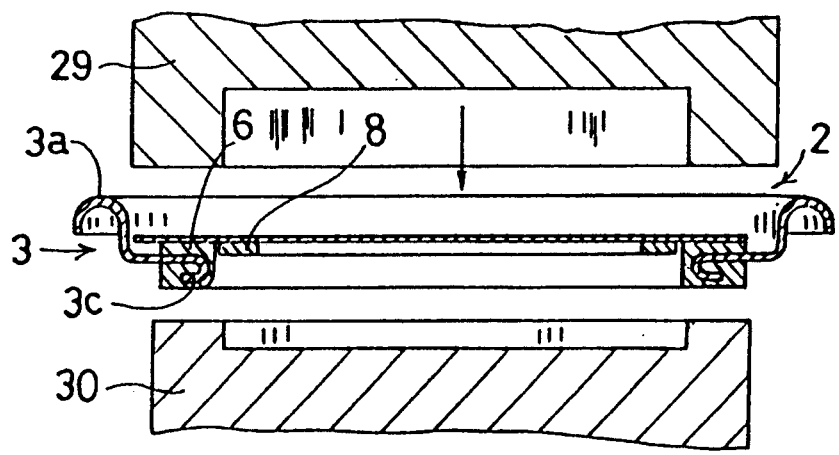
FIG. 37 is a sectional view showing a method for improving hermetical ability for the lid device according to each foregoing embodiment.

FIG. 37 shows a method of improving hermetical ability at the connection between the lid body 3 and the rim member 6 with respect to the lid device according to the second embodiment (FIGS. 5–8). Of course, the same method is applicable to the lid devices of other embodiments. Before describing the method per se, reference is made to FIG. 39 to explain why it is necessary to improve hermetical ability.

Figure 39:
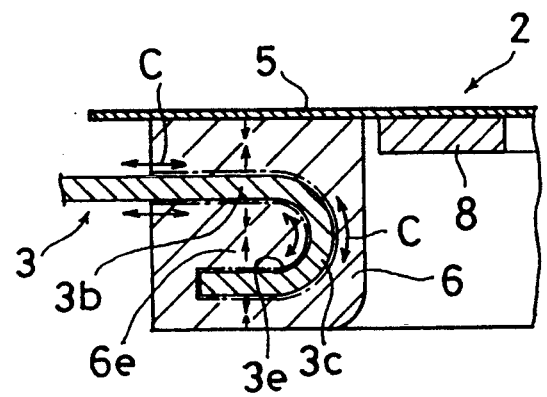

As shown in FIG. 39, the rim member 6 encloses the bent inner anchoring margin 3c of the lid body 3 and has an interior anchoring portion 6e received in the recess 3e of the anchoring margin 3c. The rim member 6 is made by molding from fluid synthetic resin which generally has tendency of volumetrically contracting upon hardening, as indicated by single-headed arrows in FIG. 39. Thus, there is a possibility that minute clearances are formed between the anchoring margin 3c and the rim member 6 along the surfaces of the anchoring margin. As a result, gases and/or moisture content may pass through the minute clearances into or out of the container, as indicated by double-headed arrows C in FIG. 39.

Figure 38:
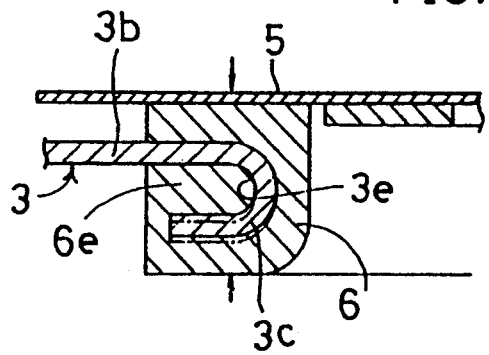
FIGS. 38 and 39 are fragmentary sectional views illustrating how and why the hermetical ability is improved by the method shown in FIG. 37.

According to the method of FIG. 37, the rim member 6 together with the inner anchoring margin 3c of the lid body 3 is compressed by a pair of presser members 29, 30 after hardening of the rim member. As a result, the inner anchoring margin 3c of the lid body is collapsively deformed to reduce the width of the recess 3e, as shown in FIG. 38. In this way, the interior anchoring portion 6e of the rim member is brought into intimate contact with the inner anchoring margin 3c, and the minute clearances are interrupted to improve hermetical ability.

In FIG. 37, compression of the rim member 6 is performed by utilizing the pair of presser members 29, 30 after taking out the lid device 2 from the respective mold members 17, 18 (see FIGS. 32 and 33). However, the mold members 17, 18 may be modified to have an additional function of compressing the rim member 6, thereby enabling to perform molding and compressing immediate succession.

Figure 41:
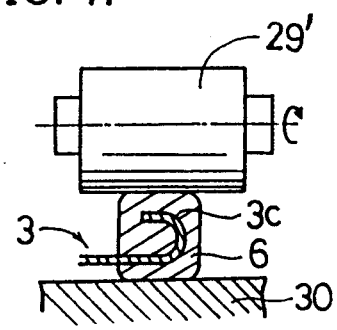
FIG. 41 is a fragmentary sectional view taken along lines XXXXI—XXXXI in FIG. 40.
Figure 40:
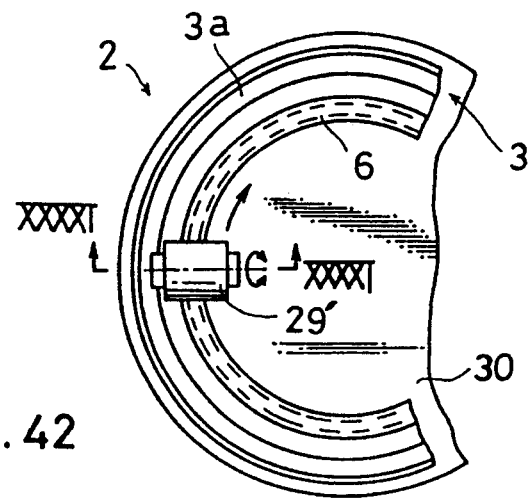
FIG. 40 is a fragmentary plan view showing another method for improving hermetical ability.

Compression of the rim member 6 may be performed by utilizing a presser roller 29', as shown in FIGS. 40 and 41. In this case, the lid device 2 is supported on a presser base 30' preferably in an inverted state, and the presser roller 29' is made to roll on the rim member 6 along the annulus thereof. Obviously, the use of the presser roller 29' is advantageous in that it is capable of uniformly pressing the rim member even if the thickness thereof is uneven.

Figure 42:
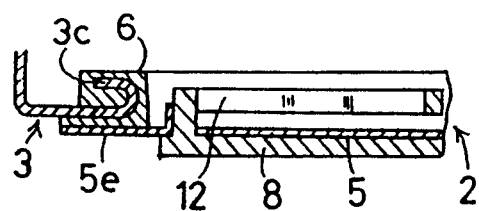
FIG. 42 is a fragmentary sectional view showing a lid device according to a fifteenth embodiment of the present invention.
Figure 43:
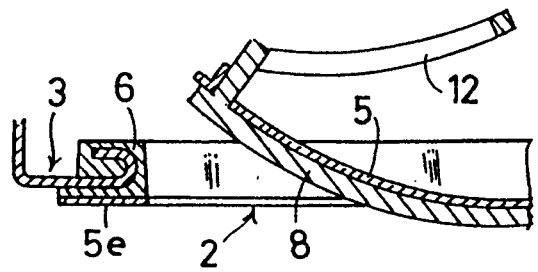
FIG. 43 is a fragmentary sectional view similar to FIG. 42 but showing the same lid device in its partially opened state.

FIGS. 42 and 43 illustrates a lid device 2 according to the fifteenth embodiment of the present invention. The lid device of this embodiment comprises a lid body 3, a closure film 5, a rim member 6, and a discal reinforcing member 8, similarly to the twelfth embodiment of FIGS. 23 and 24.

In the embodiment of FIGS. 42 and 43, the lid body 3 has an upwardly and outwardly bent inner anchoring margin 3c, and the rim member 6 is molded to enclose the inner anchoring margin 3c. More importantly, the closure film 5 is attached to the lower surface (inner surface) of the rim member, and the discal reinforcing member 8 integral with a pull tab 12 is attached to the inner surface of the film.

According to the embodiment of FIGS. 42 and 43, the peripheral portion 5e of the closure film 5 remains attached to the rim member 6 even when the pull tab 12 is pulled up for opening the lid device because the film 5 is attached to the lower surface of the rim member 6. Instead, the film 5 is torn open along the rim member 6. Attachment of the film 5 relative to the rim member 6 is such that the film 5 is not peeled off the rim member.

Figure 44:
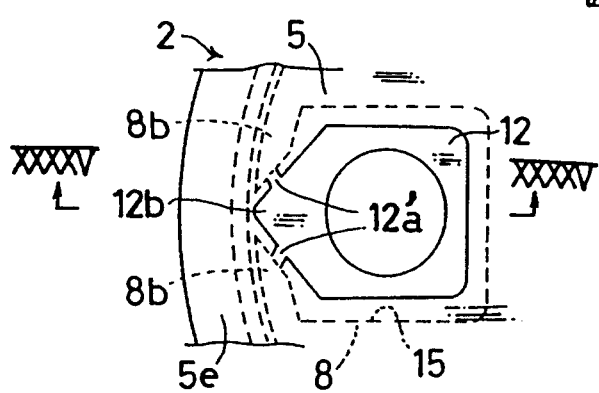
FIG. 44 is a fragmentary plan view showing a lid device according to a sixteenth embodiment of the invention.
Figure 45:
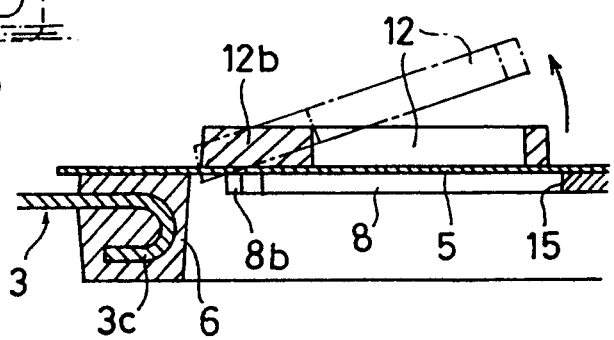
FIG. 45 is a fragmentary sectional view taken along lines XXXXV—XXXXV in FIG. 44.

FIGS. 44 and 45 show a lid device 2 according to the sixteenth embodiment of the present invention. Again, the lid device of this embodiment comprises a lid body 3, a closure film 5, a rim member 6 and a discal reinforcing member 8 integral with a pull tab 12. The reinforcing member 8 has a cutout 15 generally corresponding in shape to the pull tab 12.

In the embodiment of FIGS. 44 and 45, the closure film 5 is attached to the upper surface (outer surface) of the rim member 6. The reinforcing member 8 has a pair of separated projections 8b partially defining the cutout 15, and the pull tab 12 is connected to the respective projections 8b by a pair of hinging base portions 12a'. Further, the pull tab 12b has a tearing edge 12b at a position between the respective projections 8b of the reinforcing member.

When the pull tab 12 is pulled up, the tearing edge 12b moves downward by pivoting about the hinging portions 12a'. As a result, the film 5 is torn by the tearing edge 12b, and subsequent tension applied to the pull tab 12 causes complete tearing of the film along the rim member 6.

According to the embodiment of FIGS. 44 and 45, tearing of the film 5 is positively initiated by the tearing edge 12b of the pull tab 12. Thus, the film will not be peeled off the rim member 6 even if it is attached to the upper surface of the rim member.

The lid device shown in FIGS. 44 and 45 may be modified to include a reinforcing member 8 which is in the form of a ring split at one location.

The present invention being thus described, it is obvious that the same may be varied in many other ways. Such variations are not to be regarded as a departure from the spirit and scope of the invention, and all such modifications as would be obvious to those skilled in the art are intended to be included within the scope of the following claims.

I claim:

1. A lid device for a wide-mouthed container comprising:
    a metallic lid body fittable to an open mouth of the container, the lid body having a bent inner margin defining an opening of a predetermined shape;
    a molded resinous rim member which is an independent element extending entirely along and enclosing the bent inner margin of the lid body; and
    a non-perforated closure film attached to the rim member to close the opening of the lid body.

2. The lid device according to claim 1, wherein the rim member has a substantially straight scraping portion.

3. The lid device according to claim 1, wherein the rim member has an integral outward extension which seals between the lid body and the open mouth of the container.

4. The lid device according to claim 1, wherein the closure film is peelably attached to an outer surface of the rim member.

5. The lid device according to claim 4, wherein the closure film has a tab portion extending beyond the rim member.

6. The lid device according to claim 4, wherein the closure film has a peripheral portion extending beyond the rim member.

* * * * *